United States Patent
Zaccardi et al.

(10) Patent No.: US 10,233,837 B2
(45) Date of Patent: Mar. 19, 2019

(54) ASSEMBLY FOR AN AIRCRAFT TURBINE ENGINE COMPRISING A FAN CASING EQUIPPED WITH AN ACOUSTIC LINER INCORPORATING A FAN CASING STIFFENER

(71) Applicant: Safran Aircraft Engines, Paris (FR)

(72) Inventors: Cédric Zaccardi, Saint Maur des Fosses (FR); Gwenael Sébastien François Marion, Paris (FR)

(73) Assignee: SNECMA, Paris (FR)

( * ) Notice: Subject to any disclaimer, the term of this patent is extended or adjusted under 35 U.S.C. 154(b) by 54 days.

(21) Appl. No.: 15/558,853

(22) PCT Filed: Mar. 14, 2016

(86) PCT No.: PCT/FR2016/050556
§ 371 (c)(1),
(2) Date: Sep. 15, 2017

(87) PCT Pub. No.: WO2016/149624
PCT Pub. Date: Sep. 22, 2016

(65) Prior Publication Data
US 2018/0066581 A1 Mar. 8, 2018

(30) Foreign Application Priority Data

Mar. 16, 2015 (FR) ...................... 15 52132

(51) Int. Cl.
*B64D 33/02* (2006.01)
*F02C 7/24* (2006.01)
*F02C 7/045* (2006.01)
(52) U.S. Cl.
CPC ............. *F02C 7/045* (2013.01); *B64D 33/02* (2013.01); *F02C 7/24* (2013.01);
(Continued)

(58) Field of Classification Search
CPC ........... B64D 33/02; B64D 2033/0206; B64D 2033/0273; F02C 7/045; F02C 7/24; F05D 2240/14; F05D 2260/96
(Continued)

(56) References Cited

U.S. PATENT DOCUMENTS

| 2010/0000227 A1* | 1/2010 | Porte | ...................... B64D 33/02 60/796 |
| 2010/0019101 A1* | 1/2010 | Smith | ...................... F02C 7/04 244/53 B |

(Continued)

FOREIGN PATENT DOCUMENTS

| FR | 2 974 225 A1 | 10/2012 |
| GB | 2 452 476 A | 3/2009 |

(Continued)

OTHER PUBLICATIONS

Search Report issued in French Patent Application No. 1552132 dated Jan. 18, 2016.
(Continued)

*Primary Examiner* — Erick R Solis
(74) *Attorney, Agent, or Firm* — Pearne & Gordon LLP

(57) ABSTRACT

The present invention relates to an assembly (20) for an aircraft turbine engine comprising a fan casing (14) having an inner surface (14b), at least one acoustic panel (26) fastened using fastening elements (48, 54) to the inner surface of the fan casing, and at least one circumferential stiffener (40) of the fan casing (14). According to the invention, the fastening elements (48, 54) connect the fan casing (14) to the stiffener (40) incorporated with the acoustic panel (26).

10 Claims, 3 Drawing Sheets

(52) U.S. Cl.
CPC .............. *B64D 2033/0206* (2013.01); *B64D 2033/0266* (2013.01); *F05D 2240/14* (2013.01); *F05D 2250/283* (2013.01); *F05D 2260/96* (2013.01); *F05D 2300/603* (2013.01); *Y02T 50/672* (2013.01)

(58) Field of Classification Search
USPC .......................................................... 415/119
See application file for complete search history.

(56) References Cited

U.S. PATENT DOCUMENTS

| | | | |
|---|---|---|---|
| 2011/0142615 A1* | 6/2011 | Riou .................. | B64D 33/02 415/220 |
| 2013/0034437 A1* | 2/2013 | Porte ................. | B64D 33/02 415/213.1 |
| 2017/0184023 A1* | 6/2017 | Desjoyeaux .......... | B64D 29/06 |
| 2017/0191414 A1* | 7/2017 | Martinez ............. | F04D 29/664 |
| 2017/0234160 A1* | 8/2017 | Gemeinhardt .......... | F02C 7/05 415/200 |
| 2018/0258852 A1* | 9/2018 | Heeter ................ | F02C 7/045 |

FOREIGN PATENT DOCUMENTS

| | | |
|---|---|---|
| WO | 2010/012900 A2 | 2/2010 |
| WO | 2012/164204 A1 | 12/2012 |
| WO | 2014/068261 A1 | 5/2014 |

OTHER PUBLICATIONS

International Search Report issued in Application No. PCT/FR2016/050556 dated Jun. 14, 2016.
Written Opinion issued in Application No. PCT/FR2016/050556 dated Jun. 14, 2016.
U.S. Appl. No. 15/563,976, "Intermediate Case for an Aircraft Turbomachine Made From a Single Casting with a Lubricant Duct" filed Jul. 19, 2017, U.S. Appl. No. 15/653,976.

* cited by examiner

ASSEMBLY FOR AN AIRCRAFT TURBINE ENGINE COMPRISING A FAN CASING EQUIPPED WITH AN ACOUSTIC LINER INCORPORATING A FAN CASING STIFFENER

TECHNICAL FIELD

This invention relates to the field of aircraft turbine engines and more particularly to that of a fan casing and the environment thereof.

The invention in particular applies to aircraft turbojet engines, preferably bypass and twin-spool turbojet engines.

PRIOR ART

On aircraft turbine engines, the fan casing defines an air intake flow path and is arranged opposite the apexes of the blades of the fan, as is, for example, known in document WO2012/164204.

On the inner surface thereof, the fan casing conventionally supports acoustic panels, designed to absorb sound waves. On the outer surface thereof, this casing supports various equipment such as pipes, harnesses and housings, etc. This equipment is intended to be covered by a nacelle surrounding the turbine engine.

Moreover, in order to improve the modal behaviour and prevent the appearance of unwanted modes of vibration, the fan casing is conventionally provided with circumferential stiffeners, i.e. stiffeners that extend longitudinally over all or part of the circumference of the casing. These circumferential stiffeners are fastened to the outer surface of the fan casing or are made in one piece with same. The layout thereof is thus restricted by the presence of equipment arranged on said outer surface. In other words, the presence of equipment influences the axial positioning of the stiffeners on the casing, in addition to the axial and circumferential positioning of the fasteners for these stiffeners on the casing. The layout of the circumferential stiffeners is also restricted by the fixing screws for the flanges located at the ends of the casing, the flanges being used to connect this casing to the adjacent elements of the turbine engine. In some cases, the layout of the stiffeners can also be restricted by the presence of means for fastening the acoustic panels to the casing. On a whole, these layout restrictions imposed on the circumferential stiffeners do not allow the modal behaviour of the fan casing to be perfectly optimised.

Moreover, the presence of the casing flanges prevents the implementation of stiffeners in one piece over 360°. This would effectively make the assembly of the stiffeners on the outer surface of the casing impossible, due to the position of the flanges protruding radially outwards.

Finally, given the position thereof about the fan casing, the circumferential stiffeners have a large diameter, which directly affects the overall mass of the assembly.

There is therefore a need to optimise the assembly comprising the fan casing, the acoustic panels thereof and the circumferential stiffeners thereof, as well as the fasteners for the casing equipment.

DESCRIPTION OF THE INVENTION

In order to at least partially fulfil this need, the invention proposes an assembly for an aircraft turbine engine according to the characteristics of claim 1.

The invention is therefore advantageous in that it provides for the use of a stiffener not only to perform the stiffening function of the fan casing, but also to contribute to the fastening of an acoustic panel to said casing. By combining these two functions, additional means for fastening the acoustic panel to the casing are no longer necessary, as this fastening is obtained directly by securing the stiffener to said casing. This advantageously results in a reduced mass of the assembly according to the invention.

Moreover, the positioning of the stiffener inside the casing, and no longer on the outer surface thereof, results in a reduced diameter thereof, which further contributes to reducing the overall mass of the assembly. The internal position of the stiffener further overcomes the layout problems encountered in the prior art, as the axial position of the stiffener is not restricted by either the equipment of the casing or by the fixing screws for fastening the casing flanges. The axial and circumferential positioning of the fastenings of these stiffeners is also more flexible. This contributes as a whole to improving the modal behaviour of the fan casing.

Furthermore, since the stiffener is arranged on the side nearest the inner surface of the fan casing, the manufacture thereof in one piece over 360° can be considered, without this resulting in installation problems.

The invention preferably has at least one of the following optional characteristics, taken separately or in any combination thereof.

Said acoustic panel comprises an outer skin and/or an inner skin, in addition to a panel core that is preferably in the form of a honeycomb.

Said panel core comprises a first portion and a second portion that are axially separated from each other by said circumferential stiffener. Alternatively, the stiffener can be placed at one axial end of the panel, without leaving the scope of the invention. In this scenario, the core of the panel can therefore preferably be clamped between two stiffeners arranged at the two axial ends of the acoustic panel, or the core can be clamped between a stiffener and a skin.

Said circumferential stiffener is fastened to the outer skin and/or to the inner skin of the acoustic panel, and/or said circumferential stiffener is made in one piece with the outer skin and/or with the inner skin of the acoustic panel. These two alternatives can be combined, for example by fastening the stiffener to the outer skin and by making the stiffener in one piece with the inner skin, or vice-versa. In the event that it is made in one piece, the sole or the heel of the stiffener forms a part of the skin concerned. The solution is therefore referred to as having an "integrated stiffener", as opposed to the other solution, which is referred to as having a "mounted stiffener", wherein the stiffener is fastened to the one or more skins, for example by bonding and/or by screws, rivets, etc.

In this respect, it is noted that said circumferential stiffener more specifically comprises a sole, a stiffener core, and preferably a heel.

Preferably, said fastening means pass through the heel of said circumferential stiffener, and/or said fastening means comprise inserts housed in the core of the stiffener.

Said fastening means can be distributed circumferentially in an even or uneven manner along the stiffener, according to the needs encountered and in order to overcome the detrimental modes of vibration as effectively as possible.

For the purposes of illustration, the stiffener has a cross-section that has a general I, U, L, T, S, Z or Ω shape. However, other shapes can be considered without leaving the scope of the invention.

Preferably, the assembly comprises at least one equipment item fastened to the fan casing using said fastening means. Advantageously, specific/additional fastening means are no longer required in order to integrate these one or more equipment items onto the fan casing. This results in a reduction in the overall mass of the assembly.

Finally, the stiffener and the acoustic panel into which this stiffener is integrated extend substantially along the same angular sector, preferably between 30 and 360°. Alternatively, these two elements, one of which is integrated into the other, could extend along different angular sectors.

The invention also relates to an aircraft turbine engine comprising an assembly as disclosed hereinabove, wherein the turbine engine is preferably a turbojet engine.

Other advantages and characteristics of the invention will appear after reading the following detailed description, which is not intended to limit the invention.

BRIEF DESCRIPTION OF THE FIGURES

This description will be made with reference to the appended figures, in which.

DETAILED DESCRIPTION OF THE PREFERRED EMBODIMENTS

Figure 1:
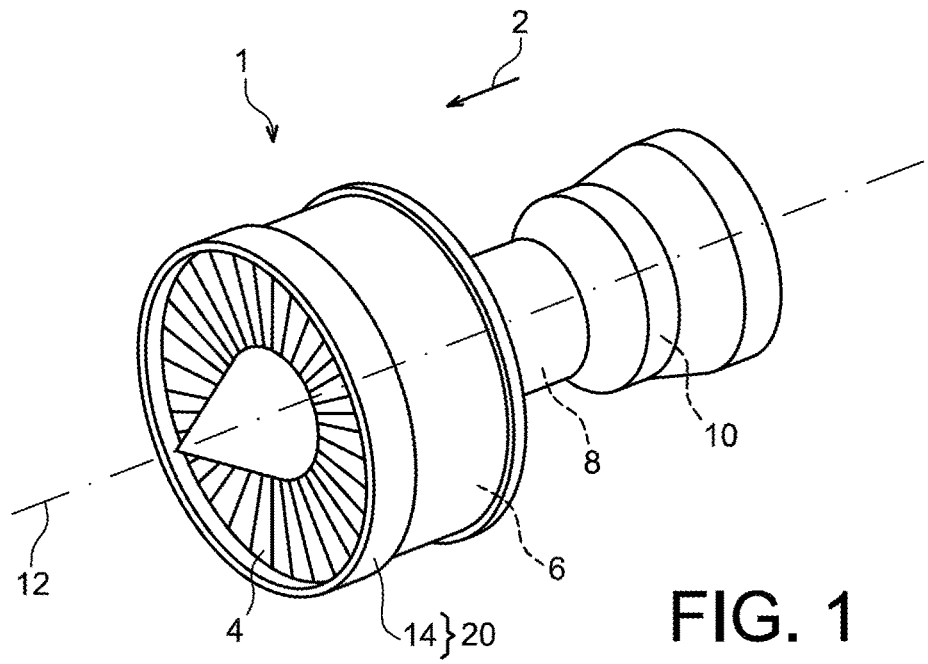
FIG. 1 is a perspective, diagrammatic view of a turbine engine comprising an assembly according to the invention.

Firstly with reference to FIG. 1, a turbine engine 1 is illustrated for an aircraft, of the bypass, twin-spool turbojet engine type. The turbojet engine 1 comprises, from front to rear with reference to a direction of thrust 2 generated by the turbojet engine, a fan 4, a compressor set 6, a combustion chamber 8 and a turbine set 10. These standard elements of the turbojet engine are centred about a longitudinal axis 12, and surrounded by a casing, in particular a fan casing 14 surrounding the fan 4, which is capable of moving in rotation about the axis 12.

The fan casing 14, situated at the front of the turbojet engine, forms a part of an assembly 20 disclosed herein, one preferred embodiment of which will now be described with reference to FIGS. 2 and 3.

The casing 14 can be metallic or made from a fibre-matrix composite material, generally an organic fibre-matrix composite. This is a structural element of the turbojet engine, centred about the axis 12 and taking on the overall shape of a ring. At the front end thereof, the casing 14 comprises a first connecting flange 22 intended, for example, for the assembly of the air intake structure. In a similar manner, the fan casing 14 comprises a second connecting flange 24 intended for the assembly of an outer ring of an intermediate casing. The two flanges 22, 24 protrude radially outwards.

Equipment (not shown in FIGS. 2 and 3) is generally intended to be arranged on the outer surface 14a of the fan casing, for example pipe, harness, or housing-type equipment, etc. On the inner surface 14b, the fan casing 14 supports one or more acoustic panels designed to absorb sound waves. In the example shown, a first acoustic panel 26 is intended to be positioned at the front of the casing, and a second acoustic panel 26 is intended to be positioned at the rear of said casing. Each of the two panels extends, for example, in a continuous manner over 360° in order to form an acoustic protection ring. Alternatively, each panel could extend over 360° by bringing a plurality of angular panel sectors end-to-end in the circumferential direction 28. According to yet another alternative, the inner surface could be only partially covered along the circumferential direction, by providing a plurality of angular panel sectors circumferentially spaced apart from each other. In order to simplify this description, each acoustic panel 26 shall be understood hereafter as extending in a continuous manner over 360°, although the invention can be implemented for all configurations described hereinabove.

Between the two acoustic panels 26 spaced axially apart from each other, the inner surface 14b is lined with an abradable layer 30 situated radially opposite the apexes of the blades 32 of the fan 4.

The two acoustic panels 26 are made in an identical or similar manner. Therefore, only one thereof will be described, with reference to FIG. 3.

The panel 26 comprises an outer skin 34 pressed against the inner surface 14b of the casing 14. It further comprises an inner skin 36 situated radially inwards relative to the outer skin 34. Between the two concentric skins, the panel 26 comprises a panel core 38, preferably made using a honeycomb structure. The two skins 34, 36 are preferably made from an organic fibre-matrix composite material, for example using glass fibres and/or carbon fibres.

One of the features of the invention resides in the integration, within the acoustic panel 26, of one or more circumferential stiffeners 40 designed to strengthen the fan casing in order to improve the modal behaviour thereof and prevent the appearance of unwanted modes of vibration. In order to simplify this description, each panel 26 will be considered hereafter to comprise a single stiffener 40 extending along the same angular sector as that of the panel into which it is integrated, i.e. in this case over 360°.

Figure 2:
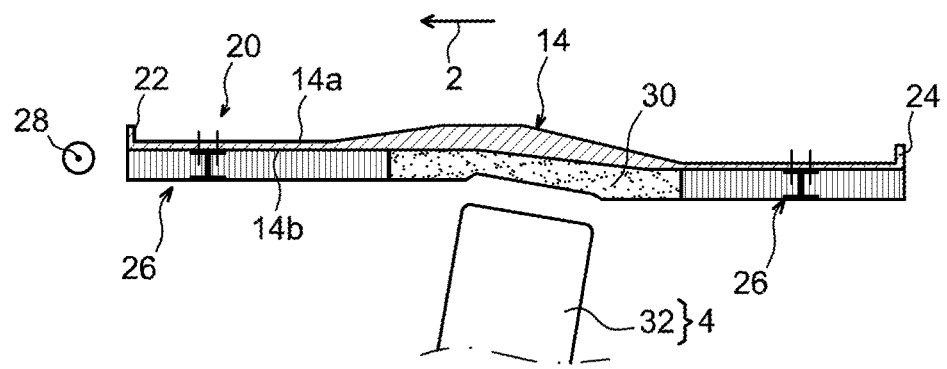
FIG. 2 is a half-sectional, axial view of the assembly according to one preferred embodiment of the invention.
Figure 3:
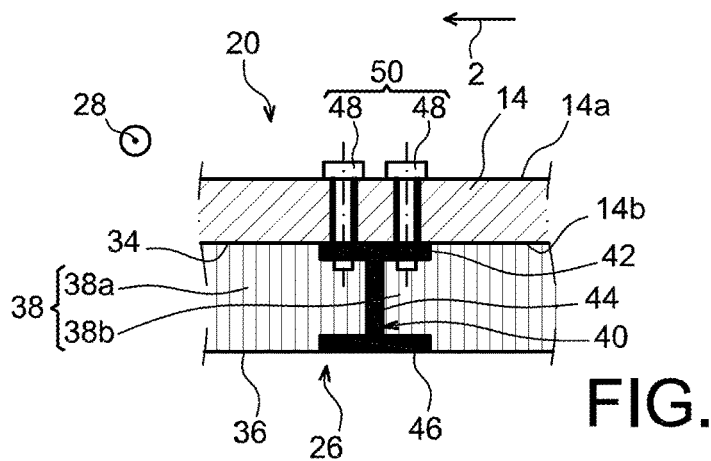
FIG. 3 is an enlarged view of a portion of the assembly shown in the previous figure.

In the preferred embodiment in FIGS. 2 and 3, the circumferential stiffener 40 extends in a transverse plane of the assembly 20, while being centred about the axis of the casing 14. Nonetheless, in addition to extending along the circumferential direction 28, the stiffener 40 could also travel with an axial component such that it leaves a transverse plane and forms, for example, a propeller or even defines zigzags. This possible extension of the stiffener 40 along the axial direction is selected according to the needs encountered.

In this case, the stiffener 40 is clamped between the two skins 34, 36, in the same respect as the core 38 of the panel that it divides into two separate portions 38a, 38b axially spaced apart from each other. Preferably, the first portion 38a and the second portion 38b of the core 38 are each in contact with the stiffener 40, which is thus protected by this core 38. A specific cutting of the edges of the core 38 into a honeycomb produces a shape that complements that of the stiffener 40, which comprises a sole 42, a stiffener core 44, and a heel 46. More specifically, the cross-section of the stiffener 40 has a general I-shape, the ends thereof respectively forming the sole 42 and the heel 46.

The sole 42 is at rest against the outer skin 34 of the panel, and fastened thereto by means of an adhesive and/or screws or similar elements. In the same manner, the heel 46 is at rest against the inner skin 36 of the panel, and is fastened thereto by means of an adhesive and/or screws or similar elements.

The stiffener 40 is cleverly used to connect the acoustic panel 26 to the inner surface 14b of the fan casing 14. Due to the integration of the stiffener 40 into the panel 26, the fastening thereof to the casing 14 simultaneously fastens the panel 26 to said casing. To achieve this, fastening means are provided, for example elements 48 such as screws, nuts or similar elements. These fastening elements 48 are oriented substantially radially and each passes through the fan casing 14, the outer skin 34 and the sole 42 of the stiffener. By way of example, a plurality of fastening points for the stiffener 40 are provided along the latter, whereby each fastening point 50 is obtained using two elements 48 positioned on either side of the stiffener core 44.

Figure 4:
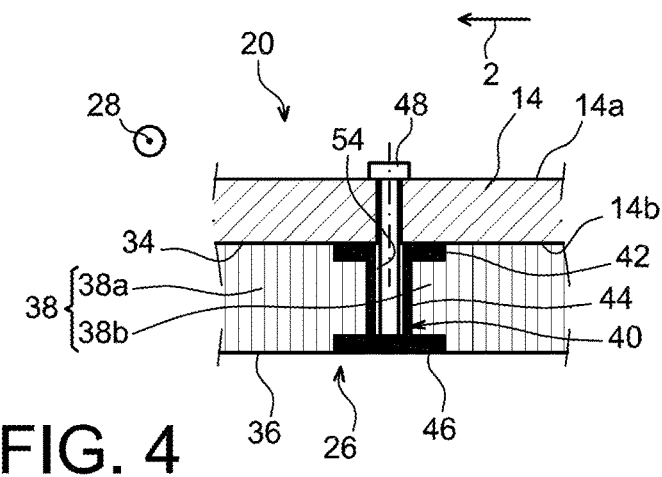
FIG. 4 is a similar view to that in FIG. 3, according to another preferred embodiment.

In one alternative shown in FIG. 4, which can be taken in combination with the embodiment that has just been described, the fastening means comprise inserts 54 housed in the core 44 of the stiffener. The core 44 can be locally oversized in order to allow for the housing of each insert 54, which engages with a fastening element 48 of the screw type, the head of which is at rest against the outer surface 14a of the fan casing.

Figure 5:
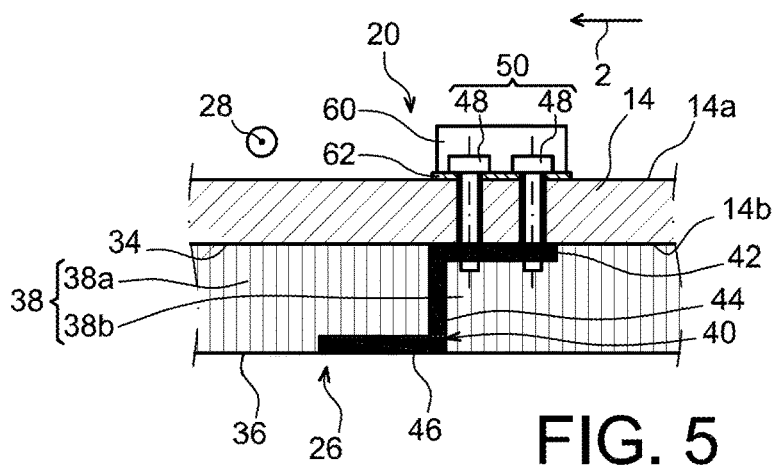
FIG. 5 is a similar view to that in FIG. 3, according to yet another preferred embodiment.

In the alternative shown in FIG. 5, only the shape of the circumferential stiffener 40 changes, i.e. it has a Z-shaped cross-section, whereby the two branches of the Z are substantially perpendicular to the core 44. This cross-section shape is also referred to as a "double L-shape". The two aforementioned branches of the Z thus respectively constitute the sole 42 and the heel 46 of the stiffener 40, the sole 42 remaining the portion of this stiffener that engages with the fastening elements 48.

Still with reference to this FIG. 5, it is noted that the fastening elements 48 can also be simultaneously used to fasten one or more equipment items 60, arranged on the outer surface 14a of the casing 14. To achieve this, the fastening elements 48 pass through an equipment fastening plate 62, which allows the equipment to not require additional fastening means. This function provided by the invention produces savings in terms of costs and in terms of the number of parts forming the assembly 20, and thus also reduces the mass thereof.

Figure 6:
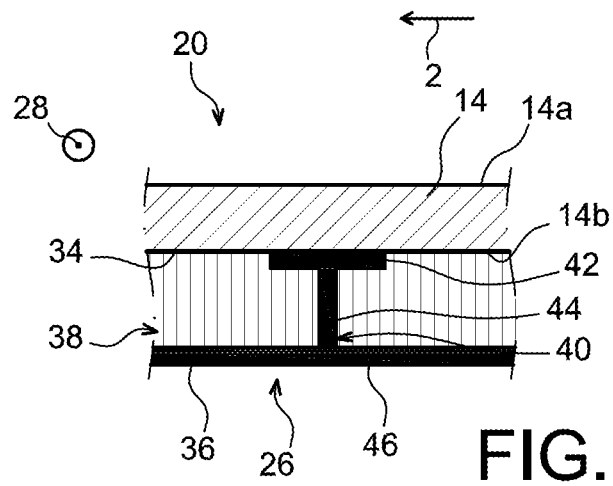
FIG. 6 is a similar view to that in FIG. 3, according to yet another preferred embodiment.

In the embodiments in FIGS. 2 to 5, the stiffener 40 is said to be mounted on the panel 26 as a result of the fastening of the sole 42 and of the heel 46 to the skins 34, 36 respectively. Another type of design can however be considered, in which the stiffener 40 is made in one piece with the skins 34, 36 of the panel. This configuration, known as "integrated" and illustrated in FIG. 6, can be considered for metal elements, however appears particularly advantageous when the skins 34, 36 and the stiffener 40 are made from a composite material. In such a case, the sole 42 of the stiffener 40 forms an integral part of the outer skin 34 of the panel, whereas the heel 46 forms an integral part of the inner skin 36 of said panel. In other words, a co-firing operation can be considered for these elements 34, 40, 36 made from a composite material.

In this embodiment in particular, the fastening elements 48 can be replaced by adhesive, designed to connect the outer skin 34 to the inner surface 14b of the casing 14. A combined solution implementing adhesive and the fastening elements 48 of the screw type can also be considered. Moreover, it is noted that, regardless of the embodiment considered, the acoustic panels can be initially bonded to the inner surface 14b of the fan casing 14.

Figure 7A:
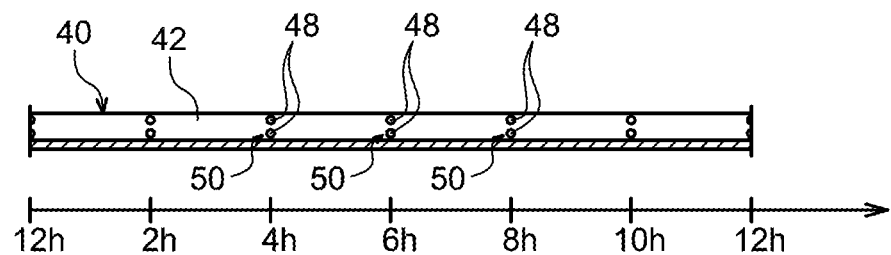
FIG. 7a is a detailed view of the sole of the stiffener of the assembly shown in FIG. 5.

In all preferred embodiments, the fastening means 48 for fastening the stiffener 40 to the casing 14 can be circumferentially distributed in an even manner, as diagrammatically illustrated in FIG. 7a, which corresponds to a detailed view of the stiffener 40 in one plane. The fastening points 50 are spaced apart by two hours and are, for example, situated in the 12, 2 and 4 o'clock positions, etc. in a clock-face coordinate system centred about the longitudinal axis of the turbojet engine.

Figure 7B:
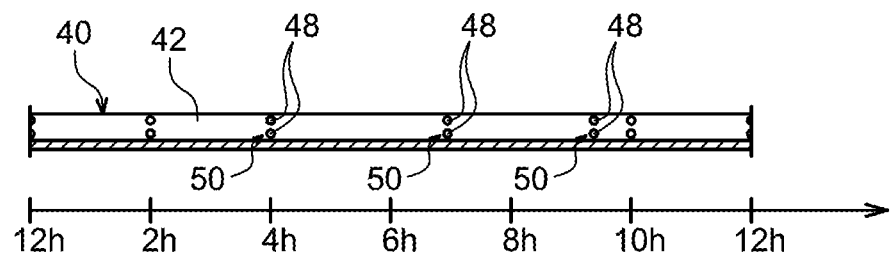
FIG. 7b is a similar view to that in FIG. 7a, according to another embodiment.

Nonetheless, the flexibility for positioning the fastening points 50 allows for the distribution thereof in an uneven manner, where beneficial for improving the modal behaviour of the casing 14 under vibration. Furthermore, in the diagrammatic view in FIG. 7b, the fastening points 50 are arranged in an uneven manner, for example in the 12, 2, 4, 7, 9 and 10 o'clock positions.

Of course, various changes can be made to the invention by those skilled in the art, said invention being described hereinabove by way of non-limiting examples.

What is claimed is:

1. Assembly (20) for an aircraft turbine engine (1) comprising a fan casing (14) having an inner surface (14b), at least one acoustic panel (26) fastened using fastening means (48, 54) to said inner surface of the fan casing, and at least one circumferential stiffener (40) of the fan casing (14), characterised in that said fastening means (48, 54) connect the fan casing (14) to the stiffener (40) incorporated with said acoustic panel (26), said fastening means (48, 54) defining a plurality of fastening points (50) distributed circumferentially along the stiffener (40), the latter extending in one piece over the entire circumferential length of the panel (26) into which it is incorporated.

2. Assembly according to claim 1, characterised in that said acoustic panel (26) comprises an outer skin (34) and/or an inner skin (36), in addition to a panel core (38) that is preferably in the form of a honeycomb.

3. Assembly according to claim 2, characterised in that said panel core (38) comprises a first portion (38a) and a second portion (38b) that are axially separated from each other by said circumferential stiffener (40).

4. Assembly according to claim 2, characterised in that said circumferential stiffener (40) is fastened to the outer skin (34) and/or to the inner skin (36) of the acoustic panel, and/or in that said circumferential stiffener (40) is made in one piece with the outer skin (34) and/or with the inner skin (36) of the acoustic panel.

5. Assembly according to claim 1, characterised in that said circumferential stiffener (40) comprises a sole (42), a stiffener core (44), and preferably a heel (46).

6. Assembly according to claim 5, characterised in that said fastening means (48, 54) pass through the heel (42) of said circumferential stiffener (40), and/or in that said fastening means (48, 54) comprise inserts (54) housed in the core (44) of the stiffener.

7. Assembly according to claim 1, characterised in that said fastening means (48, 54) are distributed circumferentially in an even manner along the circumferential stiffener (40).

8. Assembly according to claim 1, characterised in that it comprises at least one equipment item (60) fastened to the fan casing (14) using said fastening means (48, 54).

9. Assembly according to claim 1, characterised in that the circumferential stiffener (40) and the acoustic panel (26) into which this stiffener is integrated extend substantially along the same angular sector, preferably between 30 and 360°.

10. Aircraft turbine engine (1) comprising an assembly (20) according to claim 1.

* * * * *